(12) United States Patent
Kang et al.

(10) Patent No.: US 11,391,555 B2
(45) Date of Patent: Jul. 19, 2022

(54) COMPACT-SIZED TAPE MEASURE

(71) Applicant: KOMELON CORPORATION, Busan (KR)

(72) Inventors: Dong Hun Kang, Busan (KR); Nam Hoon Kang, Busan (KR); Seok Jun An, Busan (KR)

(73) Assignee: KOMELON CORPORATION, Busan (KR)

(*) Notice: Subject to any disclaimer, the term of this patent is extended or adjusted under 35 U.S.C. 154(b) by 44 days.

(21) Appl. No.: 16/603,421

(22) PCT Filed: Apr. 6, 2018

(86) PCT No.: PCT/KR2018/004048
§ 371 (c)(1),
(2) Date: Oct. 7, 2019

(87) PCT Pub. No.: WO2018/190571
PCT Pub. Date: Oct. 18, 2018

(65) Prior Publication Data
US 2020/0149855 A1 May 14, 2020

(30) Foreign Application Priority Data
Apr. 12, 2017 (KR) .................. 10-2017-0047525

(51) Int. Cl.
*G01B 3/1043* (2020.01)
*G01B 3/1046* (2020.01)
(Continued)

(52) U.S. Cl.
CPC ......... *G01B 3/1043* (2020.01); *G01B 3/1005* (2013.01); *G01B 3/1046* (2020.01); *G01B 2003/103* (2013.01); *G01B 2003/1053* (2013.01)

(58) Field of Classification Search
CPC .. G01B 3/1043; G01B 3/1046; G01B 3/1005; G01B 2003/103; G01B 2003/1053; G01B 3/1041
(Continued)

(56) References Cited

U.S. PATENT DOCUMENTS 4,121,785 A 10/1978 Quenot
4,527,334 A 7/1985 Jones et al.
(Continued)

FOREIGN PATENT DOCUMENTS

| JP | 50080451 | 7/1975 |
| JP | 06180201 | 6/1994 |
| WO | 2004094937 | 11/2004 |

OTHER PUBLICATIONS

International Search Report—PCT/KR2018/004048 dated Aug. 10, 2018.

*Primary Examiner* — Yaritza Guadalupe-McCall
(74) *Attorney, Agent, or Firm* — Cantor Colburn LLP

(57) ABSTRACT

Provided is a compact-sized tape measure including a housing, a reel rotatably mounted in the housing, and a blade wound on an outer surface of the reel and drawn out through an inlet of the housing, in which the reel includes a spring providing a force for winding the blade and a bobbin providing an inner space receiving the spring and an outer space for winding and storing the blade, and a width of a spring receiving space capable of receiving the spring in the inner space is larger than a width of a blade receiving space capable of receiving the blade in the outer space.

14 Claims, 13 Drawing Sheets

(51) Int. Cl.
   *G01B 3/1005* (2020.01)
   *G01B 3/1041* (2020.01)

(58) Field of Classification Search
   USPC .......................................................... 33/769
   See application file for complete search history.

(56) References Cited

U.S. PATENT DOCUMENTS

| | | | | |
|---|---|---|---|---|
| 4,756,087 A * | 7/1988 | Sing | ..................... | G01B 3/1005 |
| | | | | 33/765 |
| 6,243,964 B1 * | 6/2001 | Murray | ................ | G01B 3/1003 |
| | | | | 33/769 |
| 6,249,986 B1 * | 6/2001 | Murray | ................ | G01B 3/1003 |
| | | | | 33/771 |
| 6,282,808 B1 * | 9/2001 | Murray | ................ | G01B 3/1056 |
| | | | | 33/769 |
| 6,324,769 B1 * | 12/2001 | Murray | ................ | G01B 3/1003 |
| | | | | 33/755 |
| 6,449,866 B1 * | 9/2002 | Murray | ................ | G01B 3/1003 |
| | | | | 33/758 |
| 6,751,883 B2 | 6/2004 | Liao | | |
| 9,874,428 B1 * | 1/2018 | Nelson | ................ | H05K 999/99 |
| 10,836,603 B2 * | 11/2020 | Vitas | .................... | B65H 75/486 |
| 2008/0263886 A1 * | 10/2008 | Kang | ................... | G01B 3/1005 |
| | | | | 33/767 |
| 2011/0099828 A1 * | 5/2011 | Hernandez | ........... | G01B 3/1084 |
| | | | | 33/757 |
| 2012/0167403 A1 * | 7/2012 | Roeske | ................ | G01B 3/1041 |
| | | | | 33/769 |
| 2018/0273341 A1 * | 9/2018 | Vitas | ........................ | F16H 1/46 |
| 2020/0149855 A1 * | 5/2020 | Kang | ................... | G01B 3/1046 |
| 2021/0070585 A1 * | 3/2021 | Vitas | .................... | G01B 3/1005 |

* cited by examiner

COMPACT-SIZED TAPE MEASURE

TECHNICAL FIELD

The present invention relates to a tape measure and more particularly, to a compact-sized tape measure with easiness of handle grip and handling.

BACKGROUND ART

A typical tape measure includes a housing, a reel elastically supported within the housing, a blade wound on the reel in a coil shape, and an end hook coupled to the end of the blade. A user draws out the blade from the end to which the end hook is coupled for measurement and draws out a desired length to measure a length or distance of an object.

Further, the elastically operated reel includes a clockwork spring and a bobbin for receiving the clockwork spring and is provided in a state in which the blade is wound on an outer surface of the bobbin and drawn out to the housing and the blade drawn out by restoration force of the clockwork spring may be returned in a winding direction of the bobbin.

In this regard, U.S. Pat. No. 6,751,883 (registered on Jun. 22, 2004) discloses "REEL ROTATION MOUNT ARRANGEMENT EQUIPPED WITH FRICTION REDUCTION MEANS FOR TAPE MEASURE". Referring to contents regarding mounting of the reel, the blade and the spring are formed in substantially the same width and the bobbin forming the reel includes a partition in which an internal space for the spring and an external space on which the blade is wound are integrally formed and separated from each other in a circumferential direction.

U.S. Pat. No. 4,121,785 (registered on Oct. 24, 1978) discloses "TAPE MEASURE BRAKE". The US patent includes contents for temporarily stopping the blade of the tape measure by a pressing operation of a button and a side of a space for receiving the spring is opened, but the width of a space capable of actually receiving the spring for the pressing operation for braking is constraint and the width of the spring may not be actually formed to be larger than the width of the blade.

Japanese Unexamined Utility Model No. 1975-080451 (published on Jul. 11, 1975) relates to a "tape measure case" and provides a case in which the bobbin is assembled and formed and a part of a disk plate in the bobbin is exposed to the outside. Herein, implementing a brake function by using the exposed disk plate in the case is similar to U.S. Pat. No. 4,121,785 and even in Japanese Unexamined Utility Model, the width of the space capable of actually receiving the spring is smaller than the width of the space capable of receiving the blade and since one surface of the bobbin is pressed with friction and stopped, the width of the space capable of receiving the spring may not be further increased.

When all blades are returned to the inside of the housing, both the blade and the spring are kept while being wound inside the housing and a volume in which the blade and the spring are wound decides the size of the housing. Accordingly, it is the key to compactly accommodate the blade and the spring as much as possible in order to compactly form the housing of the tape measure.

DISCLOSURE

Technical Problem

An object of the present invention is to provide a tape measure capable of enhancing reception efficiency of a blade and a spring.

Another object of the present invention is to provide a tape measure having a structure which has a decreased size of a housing and may be easily held with the hand.

Technical Solution

According to an exemplary embodiment of the present invention for achieving the objects of the present invention, there is a provided a compact-sized tape measure including a housing, a reel rotatably mounted in the housing, and a blade wound on an outer surface of the reel and drawn out through an inlet of the housing, in which the reel includes a spring providing a force for winding the blade and a bobbin providing an inner space receiving the spring and an outer space for winding and storing the blade, and a width of a spring receiving space capable of receiving the spring in the inner space is larger than a width of a blade receiving space capable of receiving the blade in the outer space.

The spring and the spring receiving space corresponding to the spring are relatively increased to decrease the thickness of the spring or reduce a dimension of the inner space occupied by the spring. Accordingly, the housing having a compact size can be formed as a whole.

In addition, by varying the widths of the inner space and the outer space in the bobbin, a step between the inner space and the outer space is structurally formed, and a space in which the spring may be extended is naturally restricted, thereby facilitating and simplifying the process in designing and assembling the bobbin.

As a result, in the conventional bobbin, a thick partition wall of blocking the inner space and the outer space is provided, but in the bobbin of the tape measure according to the exemplary embodiment, the partition wall of the bobbin can be omitted or may be formed to be extremely thin or minimized.

In order for the inner space to be larger than the outer space, the housing may include a protrusion protruding from the periphery of the rotation shaft of the reel in response to the inner space and a peripheral portion provided with a relatively smaller width than that of the protrusion in response to the outer space. As a result, by the bobbin, which is formed wider than the inner space for the spring and the outer space for the blade, the housing has the protrusion formed at the center adjacent to the rotation shaft and the housing may be provided with a ball shape which is easy to grasp as a whole or a shape in which the central portion of the side surface protrudes.

Further, the rotation shaft is not simply provided in a convex shape, but the height of the housing is decreased by reducing the size of the inner space for the spring 150 by the inner space, and thus, the housing may be provided in a size and shape that allows the operator to hold more easily even if the same blade is used.

Of course, through this process, the width of the spring received in the inner space may be lager than the width of the blade wound in the outer space, and in order to more effectively obtain the effect, it is preferable that the width of the spring is more than 120% and equal to or less than 140% larger than the width of the blade. Here, the width of the spring may be supplied to 120% or less. However, if the width of the spring exceeds 120%, the shapes of the bobbin and the housing may be more compact and may be a good shape which is held with the hand. Further, when the width of the spring is supplied to more than 140%, the height of the housing may be further reduced, but the shape may be a shape difficult to be held with the hand.

The structure of the bobbin may be more specifically defined. As an example, the bobbin may include a first bobbin portion and a second bobbin portion which are laterally separated from in the rotation shaft direction, and the first bobbin portion and the second bobbin portion may include a first disk outer wall corresponding to the inner space, a cylindrical partition wall formed vertically on the first disk outer wall, and a second disk outer wall extended from the partition wall and corresponding to the outer space, respectively.

The partition walls of the first bobbin portion and the second bobbin portion may support both ends of the blade in a width direction, a gap between the first disk outer walls may correspond to a width of the spring receiving space, and a gap between the second disk outer walls may correspond to the blade receiving space.

Herein, the cylindrical partition wall may be formed to correspond to the shape of the inner space for the spring, and the partition wall may be extended thinly toward a surface facing each other or may also be formed without the extended portion.

Further, when the first bobbin portion and the second bobbin portion are provided separately from each other, the spring and the blade may be easily coupled with each other as compared with the case where the first bobbin portion and the second bobbin portion are integrally provided. The spring is not forcibly inserted to the sealed space, but may be located in the inner space by approaching the bobbin portions separated from the right and left sides.

In this case of the coupling, it may not be necessary to assemble the first bobbin portion and the second bobbin portion together to be formed integrally. That is, the bobbin, the spring, and the blade may be easily assembled with each other only by assembling the first bobbin and the second bobbin to rotate independently each other. Since the first bobbin portion and the second bobbin portion are rotated together by mutual friction with the blade, it is not necessary to integrally form the first bobbin portion and the second bobbin portion in the assembly.

A central convex portion may be formed as an appearance of the bobbin in response to the inner space. The central convex portion may be received in the housing, but a through hole is formed in the housing, and the central convex portion may be formed to be exposed through one side or both sides of the housing. A part of the bobbin is exposed through the housing to restrict the rotation of the bobbin using the palm or fingers of the user, and the user may directly lock or unlock the rotation of the reel to temporarily control the winding of the blade.

According to the exemplary embodiment, the central convex portion of the bobbin may be entirely exposed to the outside, and one side or both sides of the central convex portion may also be exposed, but only a part of the central convex portion, not the entire central convex portion including the rotation shaft can be exposed. Of course, in some cases, the peripheral portion corresponding to the outer space instead of the central convex portion may be exposed.

In the exemplary embodiment, the spring receiving space and the inner space may be defined identically, and the blade receiving space and the outer space may be defined in the same manner. However, in some cases, the spring receiving space, which can substantially receive the spring even when the inner space is partially convexed, may occupy a space smaller than the inner space, which may be applied to the blade receiving space and the outer space. From such a viewpoint, the width of the spring receiving space may be defined from the outer surface of the rotation shaft of the reel to the partition formed between the inner space and the outer space, and the width of the spring receiving space defined in this range is preferably at least larger than the width of the spring, and is preferably larger than that of the blade receiving space.

The bobbin is located in the housing and both the outer space and the inner space may be provided in the bobbin, but the outer space and the inner space may also be defined by the bobbin and the housing. As one example, the housing may include a protrusion providing an inner surface extended abound the rotation shaft of the reel in response to the inner space, and a peripheral portion providing an inner surface relatively narrower than the protrusion in response to the outer space. The bobbin may be formed by including a partition wall provided between the inner space and the outer space and a first disk outer wall connected to the partition wall and covering at least one side of the inner space. Here, even if there is no separate structure for defining the outer space in the bobbin, the outer space may be defined by the partition wall of the bobbin and the inner surface of the peripheral portion.

As another example, in the housing including the protrusion and the peripheral portion, the bobbin may be formed by including a partition wall provided between the inner space and the outer space, and a second disk outer wall connected to the partition wall and covering at least one side of the outer space. Here, even if there is no separate structure for defining the inner space in the bobbin, the inner space may be defined by the partition wall and the inner surface of the protrusion. In this case, a separate structure connected to the rotation shaft may be omitted in the bobbin, and the partition wall of the bobbin may be elastically supported by a spring or the like so as to be supported at the step connecting the peripheral portion and the protrusion in the housing.

As another example, in the housing including the protrusion and the peripheral portion, the bobbin may be provided only by a partition wall provided between the inner space and the outer space. Herein, even if there is no separate structure for defining the inner space and the outer space in the bobbin, the inner space may be defined by the partition wall and the inner surface of the protrusion, and the outer space may be defined by the partition wall and the inner surface of the peripheral portion. A separate structure connected to the rotation shaft may be omitted in the bobbin, and the partition wall of the bobbin may be elastically supported by a spring or the like so as to be supported at the step connecting the peripheral portion and the protrusion in the housing.

Advantageous Effects

According to the tape measure of the present invention, it is possible to reduce a height dimension of an inner space capable of receiving a spring, and as a result, it is possible to reduce a size of a housing based on a blade having the same width and length and form a structure which is easily held with the hand.

Further, since a step is naturally formed between an inner space and an outer space, it is possible to structurally prevent the spring from being unwound from the outside, and the manufacturing process is also easy, which is very advantageous for automation.

MODES OF THE INVENTION

Figure 1:
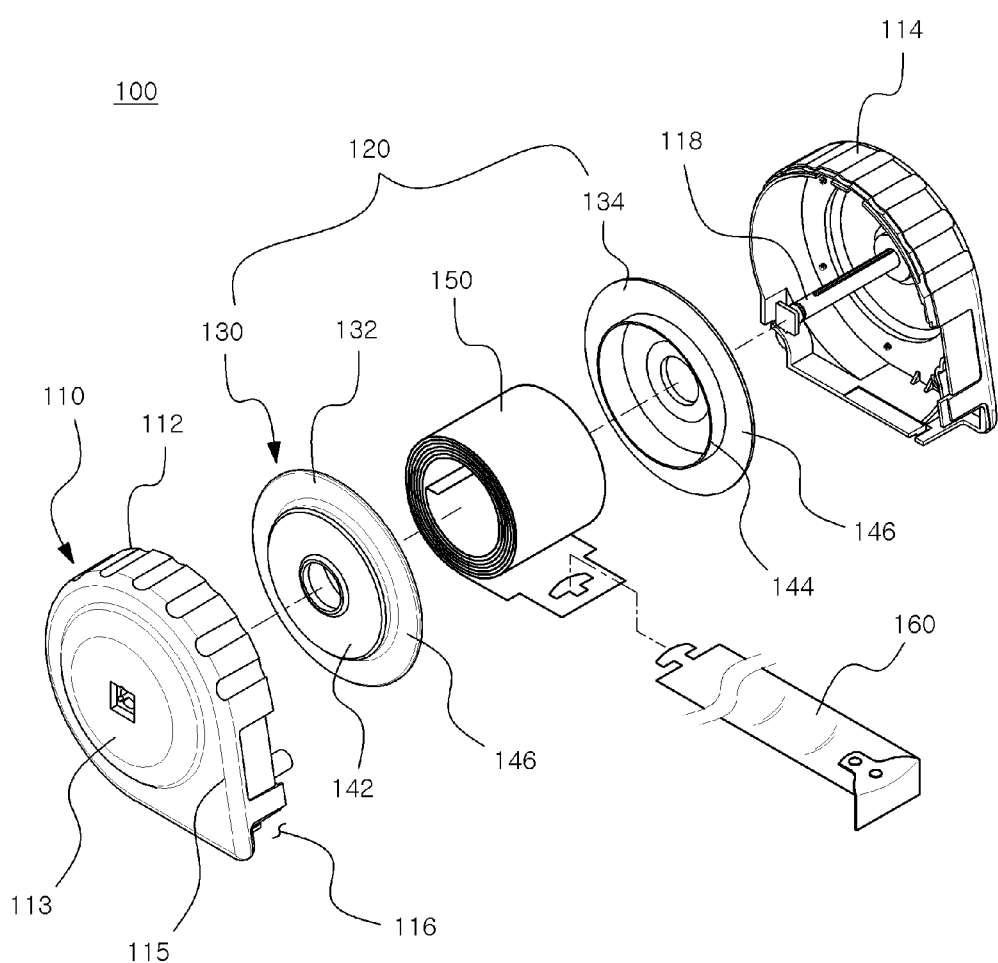
FIG. 1 is an exploded perspective view of a compact-sized tape measure according to an exemplary embodiment of the present invention.

Hereinafter, preferred embodiments of the present invention will be described in detail with reference to the annexed drawings, but should be not construed as limiting or restricting the present invention. For reference, in the present invention, like reference numerals designate substantially like constituent elements, the contents disclosed in different drawings under the rule can be cited and described, and the contents which are determined to be apparent to those skilled in the art or repeated can be omitted.

Figure 2:
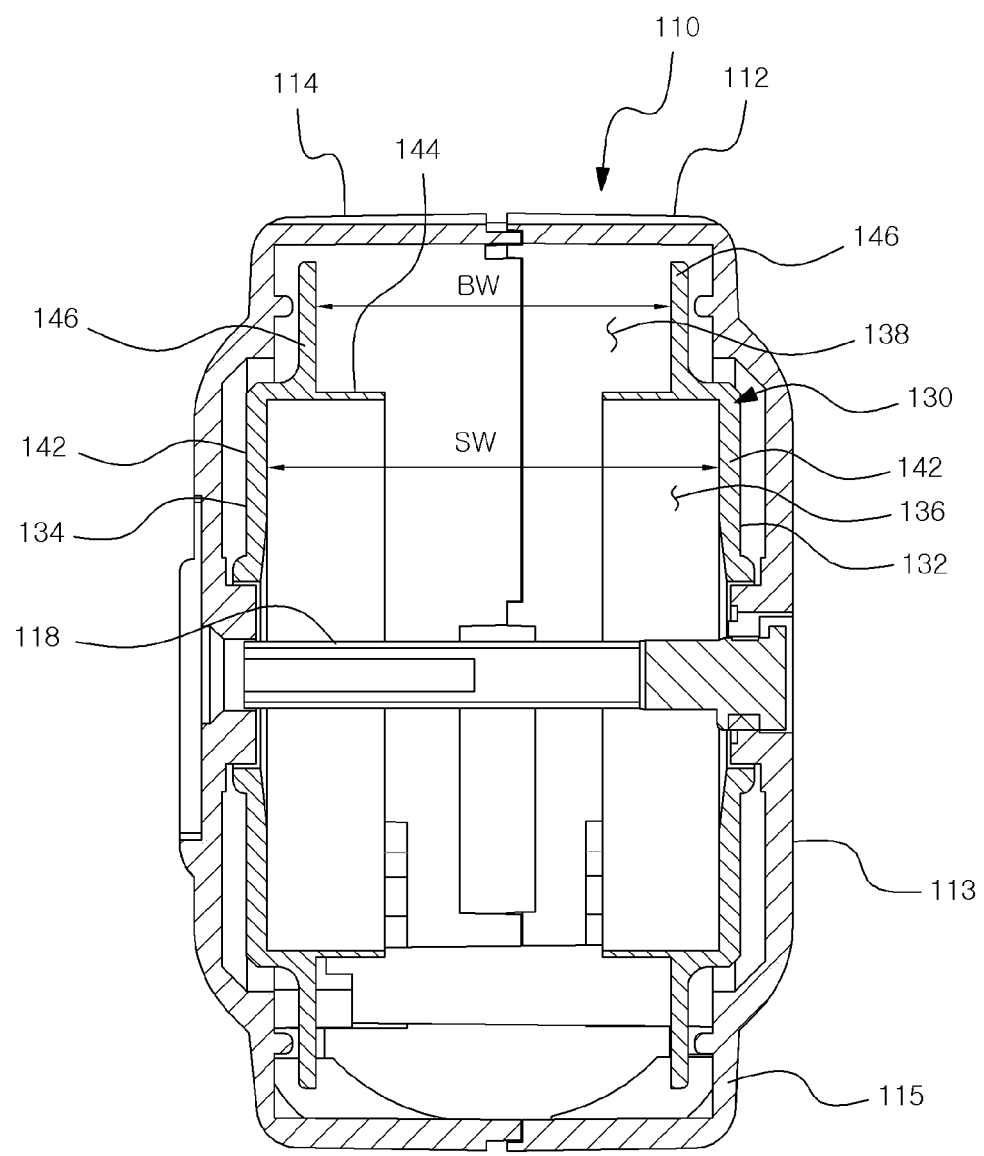
FIG. 2 is a cross-sectional view for describing a state in which a blade and a spring are excluded from the tape measure of FIG. 1.
Figure 3:
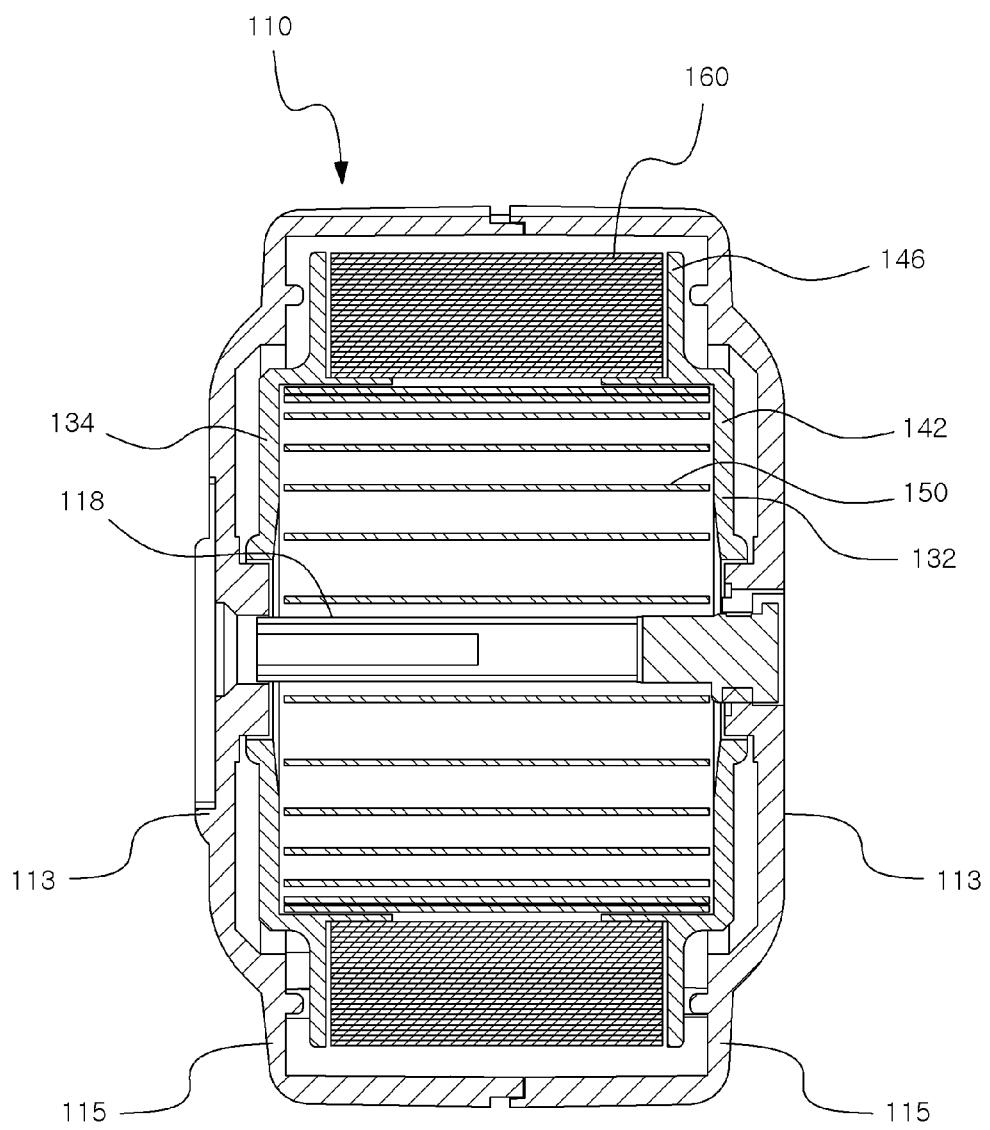
FIG. 3 is a cross-sectional view for describing a state in which the blade and the spring are assembled in the tape measure of FIG. 1.
Figure 4:
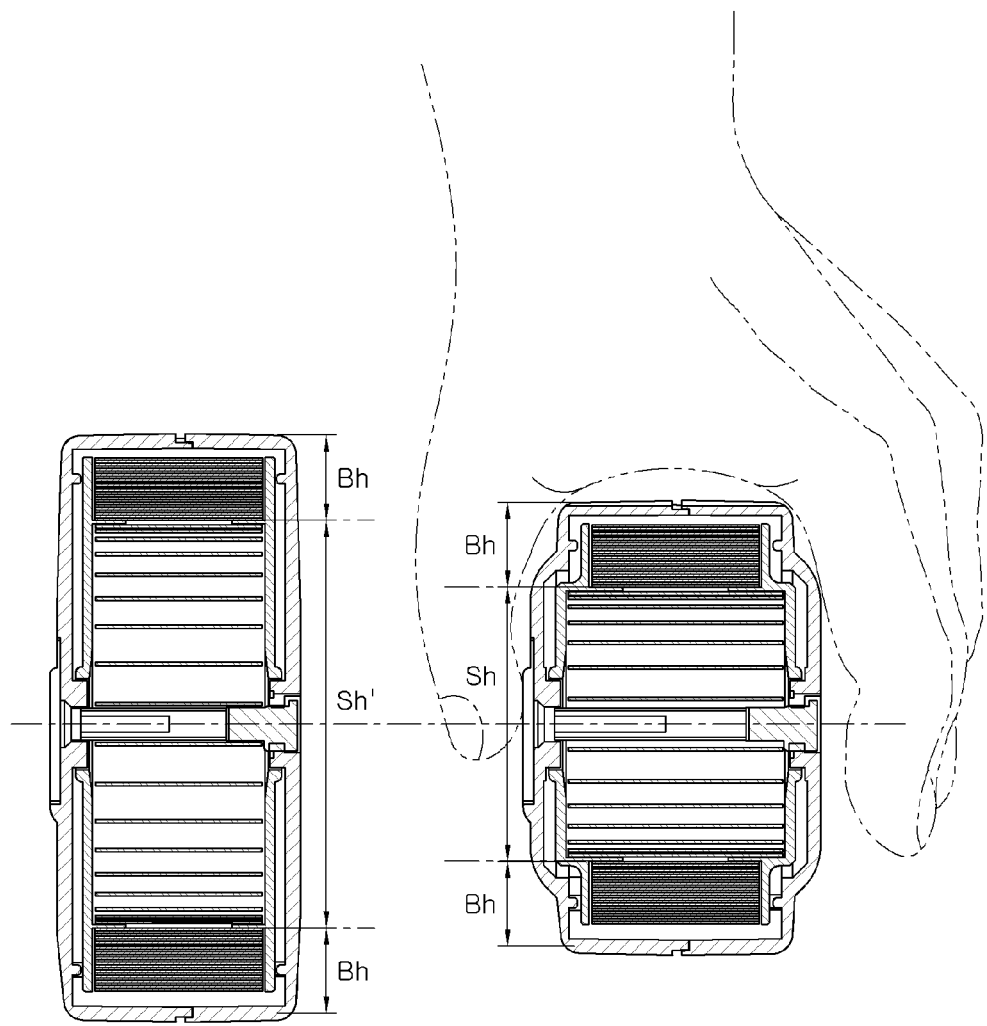
FIG. 4 is a cross-sectional view for comparing a conventional tape measure with the tape measure according to the exemplary embodiment of the present invention.

FIG. 1 is an exploded perspective view of a compact-sized tape measure according to an exemplary embodiment of the present invention, FIG. 2 is a cross-sectional view for describing a state in which a blade and a spring are excluded from the tape measure of FIG. 1, and FIG. 3 is a cross-sectional view for describing a state in which the blade and the spring are assembled in the tape measure of FIG. 1. FIG. 4 is a cross-sectional view for comparing a conventional tape measure with the tape measure according to the exemplary embodiment of the present invention.

Referring to FIGS. 1 to 4, a compact-sized tape measure 100 according to the exemplary embodiment includes a housing 110, a reel 120 rotatably mounted in the housing 110, and a blade 160 wound on an outer surface of the reel 120 and drawn out through an inlet 116 of the housing.

The reel 120 according to the exemplary embodiment is received inside the housing 110 having a first housing 112 and a second housing 114 and includes a bobbin 130 and a spring 150 received in the bobbin 130. The bobbin 130 provides an inner space 136 receiving the spring 150 and an outer space 138 winding and storing the blade 160 so that the width of the inner space 136 for the spring 150 may be larger than the width of the outer space 138 for the blade 160.

In the exemplary embodiment, a spring receiving space capable of receiving the inner space 136 and the spring 150 is defined in the same size, and the outer space 138 may also be defined in the same size as a blade receiving space capable of receiving the blade 160. Accordingly, a width SW of the spring receiving space may correspond to a width of the inner space 136 and the width SW of the spring receiving space may be defined as a substantially constant size from the outer surface of a rotation shaft to a partition wall 144. In addition, a width BW of the blade receiving space may equally correspond to the width of the outer space 138.

Of course, in another exemplary embodiment, the inner space may be provided larger than the spring receiving space, and a maximum width of the inner space may be larger than the width SW of the spring receiving space. However, even in the case, the width of the spring received in the inner space may be provided smaller than the width SW of the spring receiving space within an allowable range of the spring receiving space.

In the exemplary embodiment, the spring 150 is provided in a clockwise shape, an inner end thereof is fixed to a rotation shaft 118 of the reel 120, and an outer end thereof is fixed to the end of the blade 160. Accordingly, the spring 150 continuously supplies a force for winding the blade 160, and the blade 160 drawn out of the housing 110 returns to the inside of the housing 110 to be wound on the outer space 138 of the bobbin 130.

If the widths of the inner space and the outer space are provided substantially the same as each other in the conventional bobbin, the inner space and the outer space in the conventional bobbin may be relatively larger than the inner space 136 and the outer space 138 in the bobbin 130 according to the exemplary embodiment. As a result, a thickness of the spring 150 received in the inner space 136 may be reduced, and a diameter of the inner space occupied by the spring 150 may be relatively smaller than that of the conventional bobbin.

In general, the tape measure may be divided into tape measures capable of measuring 3.5 m and 5.5 m according to a maximum measurable length, and may be provided in various types according to a material or width of the blade. The maximum length of the tape measure may be determined by the length of the blade, and as the maximum length of the tape measure increases, the width of the blade may also increase together. For example, the blade of the tape measure capable of measuring up to 5.5 m is provided with a width of about 2.7 cm or more, and the entire housing is formed with a height of about 85 to 90 mm in the related art. However, according to the exemplary embodiment, the height may be reduced by about 10%, and the size of the housing may be reduced up to about 75 to 80 mm with respect to the same blade.

However, according to the exemplary embodiment, the width of the inner space 136 for the spring may be larger than that of the outer space 138 for the blade, and as shown in FIG. 4, assuming that the blade having substantially the same length and width is handled, a height Bh of the outer space for the blade may also be substantially the same. However, according to the exemplary embodiment, a height or a dimension Sh of the inner space 136 may be formed to be relatively smaller than a height or a dimension Sh' of the inner space in the conventional bobbin. As a result, the height of the bobbin according to the exemplary embodiment may be relatively smaller than that of the conventional bobbin. The fact that the height of the bobbin may be smaller than that of the conventional bobbin may mean that it is possible to form a housing of a compact size as a whole.

Referring to FIG. 2, by varying the widths of the inner space 136 and the outer space 138 in the bobbin 130, a step between the inner space 136 and the outer space 138 is structurally formed, and the space in which the spring 150 may be extended using the step may be naturally limited.

To this end, the bobbin 130 according to the exemplary embodiment may include a first bobbin portion 132 and a second bobbin portion 134 which are laterally separated from each other in the direction of the rotation shaft. The first bobbin portion 132 and the second bobbin portion 134 each may include a first disk outer wall 142 corresponding to the inner space 136, a cylindrical partition wall 144 formed vertically to the first disk outer wall 142, and a second disk outer wall 146 extending vertically from the partition wall 144 toward the outer side.

The first bobbin portion 132 and the second bobbin portion 134 are separated from each other, but the first disk outer wall 142 and the partition wall 144 may define the inner space 136 of the bobbin 130 and the second disk outer wall 146 may define the outer space 138 of the bobbin 130.

In the exemplary embodiment, the partition walls 144 of the first bobbin portion 132 and the second bobbin portion 134 extend inward and the second disk outer wall 146 is formed vertically from an intermediate point of the partition wall 144. Accordingly, the partition wall 144 may support both ends of the blade 160 in a width direction.

A gap between the first disk outer walls 142 corresponds to the width of the spring 150 and a gap between the second disk outer walls 146 may correspond to the width of the blade 160. Accordingly, as shown in FIG. 3, in the tape measure 100 according to the exemplary embodiment, the width of the spring 150 may be larger than the width of the blade 160, and a height or a diameter Sh of the inner space 136 for spring 150 may be relatively smaller than those in the related art.

More preferably, the width of the spring 150 may be formed in a dimension of more than 120% or 140% or less larger than the width of the blade 160. Of course, it is theoretically possible that the width of the spring 150 may be formed in a dimension of more than 120% or 140% or less larger than the width of the blade 160, but when the width of the spring 150 exceeds 120%, the shapes of the bobbin 130 and the housing 110 may be more compact and easily held with the hand. This shape may be provided by the shape of a protrusion 113 of the housing 110 and a peripheral portion 115 thereof.

For reference, when the width of the spring 150 is supplied larger than 140%, the height of the housing 110 may be further reduced. However, since the protrusion 113 may protrude more excessively than the peripheral portion 115, the shape may not be cosmetically beautiful and may be difficult to be held with one hand.

According to FIG. 3, the first bobbin portion 132 and the second bobbin portion 134 may be provided separately from each other. The coupling of the spring 150 and the blade 160 may be facilitated as compared with the case where the bobbin is integrally provided, and the spring 150 may be simply assembled by horizontally approaching the first bobbin portion 132 and the second bobbin portion 134 while the spring is maximally wound instead of the process of inserting forcibly the spring to the sealed space, and thus it is possible to simplify and facilitate the process of designing and assembling the bobbin.

Even structurally, in the conventional bobbin, a thick partition wall of blocking the inner space and the outer space is provided and thus there is a limitation to reduce the thickness thereof only by the partition wall. However, in the bobbin 130 of the tape measure 100 according to the exemplary embodiment, the partition wall of blocking the inner space and the outer space can be omitted or may be formed to be extremely thin or minimized, and thus it is more advantageous to reduce the dimension.

As described above, in order for the inner space 136 of the bobbin 130 to be larger than the outer space 138, the housing 110 may include a protrusion 113 protruding from the periphery of the rotation shaft 118 of the reel 120 in response to the inner space 136 and a peripheral portion 115 provided with a relatively smaller width than that of the protrusion 113 in response to the outer space 138.

As a result, by the bobbin 130, which is formed wider than the inner space 136 for the spring 150 and the outer space 138 for the blade 160, the housing 110 has the protrusion 113 formed at the center adjacent to the rotation shaft and the housing 110 may be provided with a ball shape which is easy to grasp as a whole or a shape in which the central portion of the side surface protrudes.

Further, the center portion of the side surface is not simply provided in a convex shape, but the overall height of the housing 110 may be decreased by reducing the size of the inner space 136 for the spring 150, and the housing 110 may be provided in a size and a shape that allow the operator to handle more easily even if a blade of the same condition having the same length and width is used.

In the exemplary embodiment, it is not necessarily required to mutually assemble the first bobbin portion 132 and the second bobbin portion 134 to be integrally formed. That is, the bobbin 130, the spring 150, and the blade 160 may be easily assembled with each other only by assembling the first bobbin 132 and the second bobbin 134 to rotate independently each other. Since the first bobbin portion 132 and the second bobbin portion 134 are rotated together by mutual friction with the blade 160, it is not necessary to integrally form the first bobbin portion 132 and the second bobbin portion 134 in the assembly.

Figure 5:
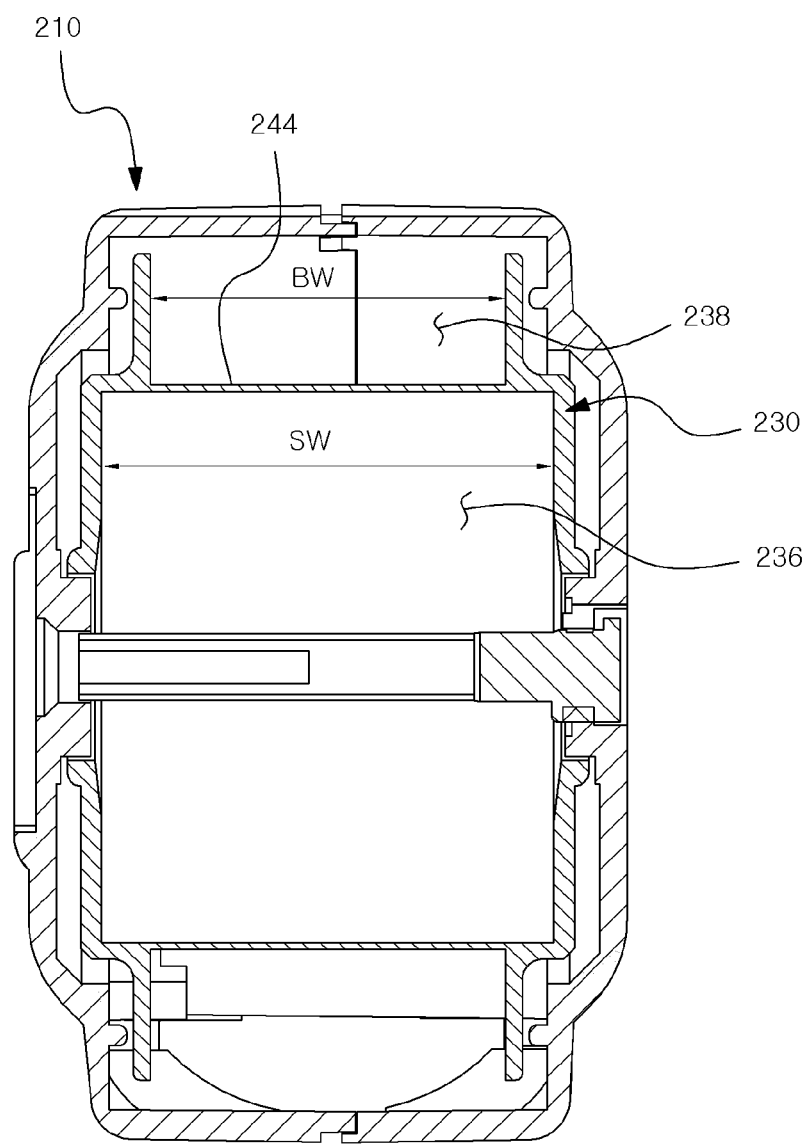
FIG. 5 is a cross-sectional view for describing a compact-sized tape measure according to an exemplary embodiment of the present invention.

FIG. 5 is a cross-sectional view for describing the compact-sized tape measure according to the exemplary embodiment of the present invention.

Referring to FIG. 5, the compact-sized tape measure 200 according to the exemplary embodiment may include a housing 210, a reel including a bobbin 230 and a spring, and a blade wound on the reel. Like the previous exemplar y embodiment, the bobbins may be laterally separated from each other to operate independently. However, like the exemplary embodiment, the bobbin 230 may be integrally provided while maintaining the condition that the inner space 236 is relatively wider than the outer space 238 and a partition wall 244 integrally connected between the inner space 236 and the outer space 238 may be provided.

The width SW of the spring receiving space in the inner space 236 may correspond to the width of the spring received therein and may be provided in a constant size from the outer surface of the rotation shaft to the partition wall 244, and the width BW of the blade receiving space may correspond to the width of the blade to be received. In the exemplary embodiment, as the width SW of the spring receiving space is larger than the width BW of the blade receiving space, the width of the received spring is also larger than the width of the blade.

In this case, the height of the inner space 236, which may receive the spring, may be small. As a result, the size of the housing may be reduced on the basis of the blades having the same width and length and the housing may have a structure which is easily held with the hand.

Figure 6:
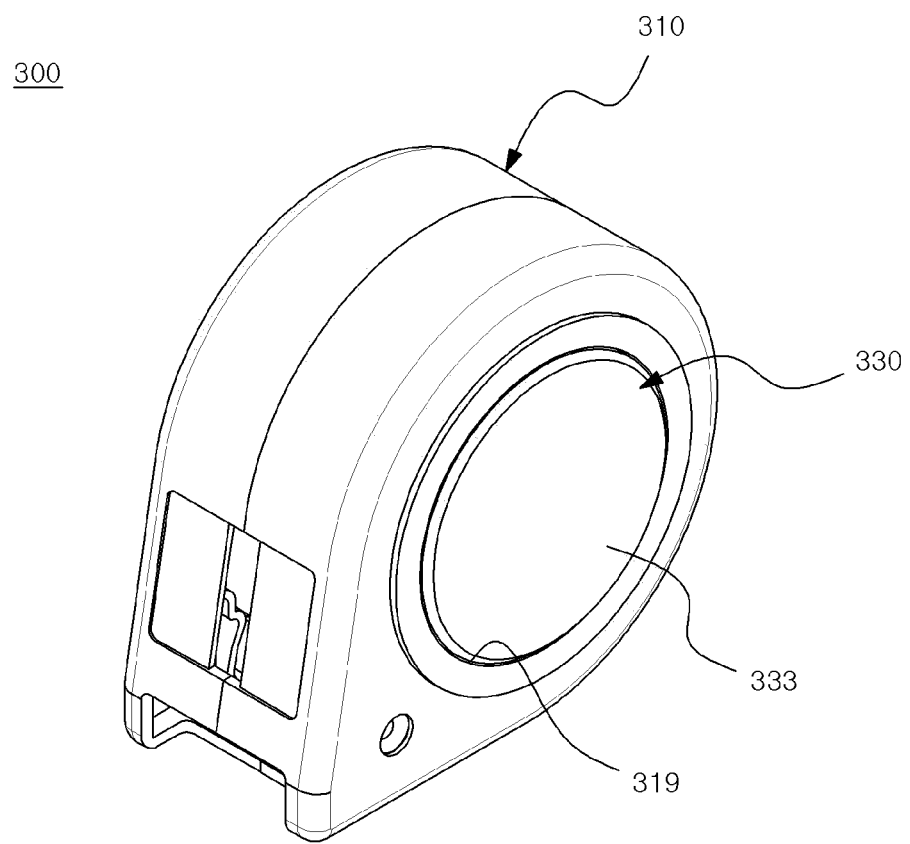
FIG. 6 is a perspective view for describing a compact-sized tape measure according to an exemplary embodiment of the present invention.
Figure 7:
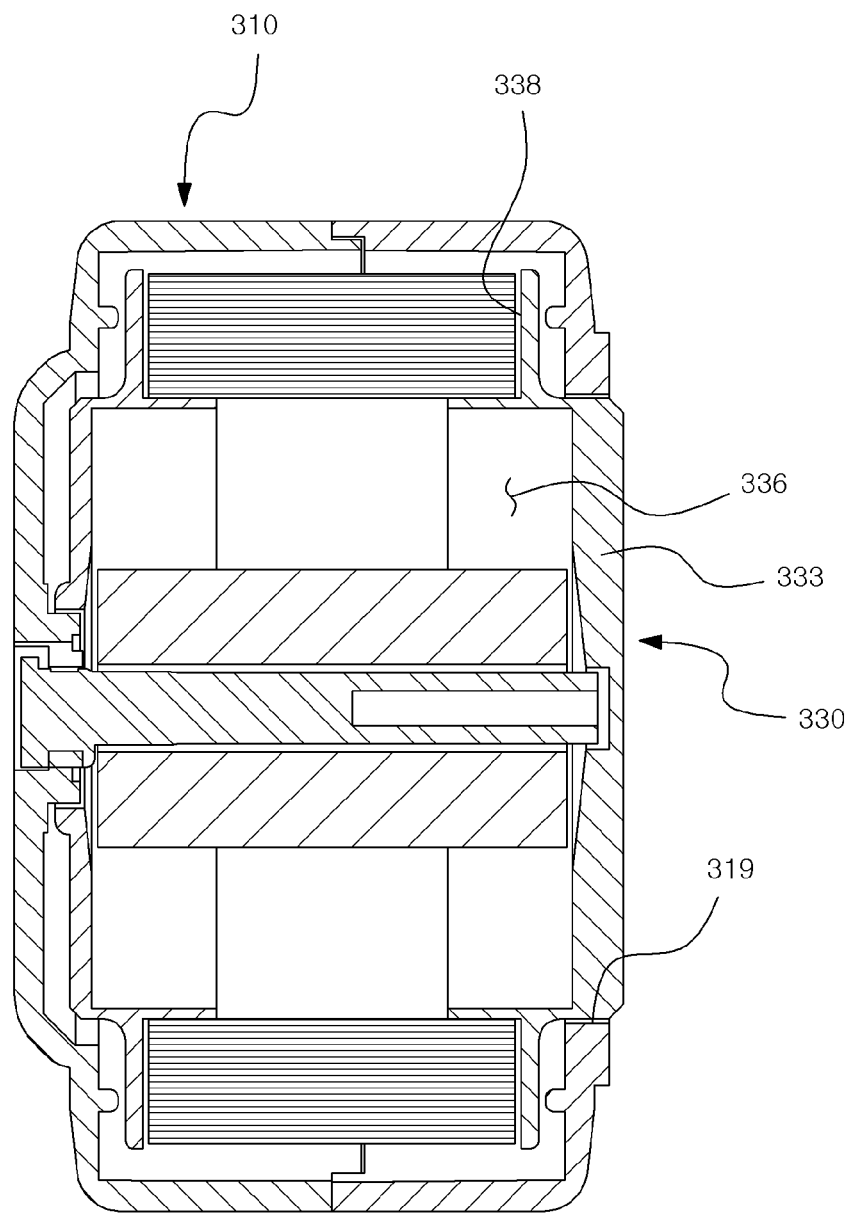
FIG. 7 is a cross-sectional view for describing an internal structure of the compact-sized tape measure of FIG. 6.

FIG. 6 is a perspective view for describing a compact-sized tape measure according to an exemplary embodiment of the present invention and FIG. 7 is a cross-sectional view for describing an internal structure of the compact-sized tape measure of FIG. 6.

Referring to FIGS. 6 and 7, a compact-sized tape measure 300 may include a housing 310, a reel including a bobbin 330 and a spring, and a blade. The bobbin 330 includes an inner space 336 formed to have a relatively larger width than an outer space 338 and may have a central convex portion 333 formed around the rotation shaft of the bobbin 330 in response to the inner space 336.

The central convex portion 333 has a structure protruding relatively around the periphery thereof, may correspond to the first disk outer wall, and may be exposed to the outside through a through hole 319 formed in the housing 310. In the exemplary embodiment, the through hole 319 is formed on one side of the housing 310 and may be formed to be able to receive an outer peripheral surface of the central convex portion 333.

The central convex portion 333 of the bobbin 330 may be exposed through the through hole 319 of the housing 310 and the user may restrict the rotation of the bobbin 330 using the palm or fingers when the blade is wound by the spring. The user may directly lock or unlock the rotation of the reel by pressing a part of the bobbin 330 to be exposed.

Figure 8:
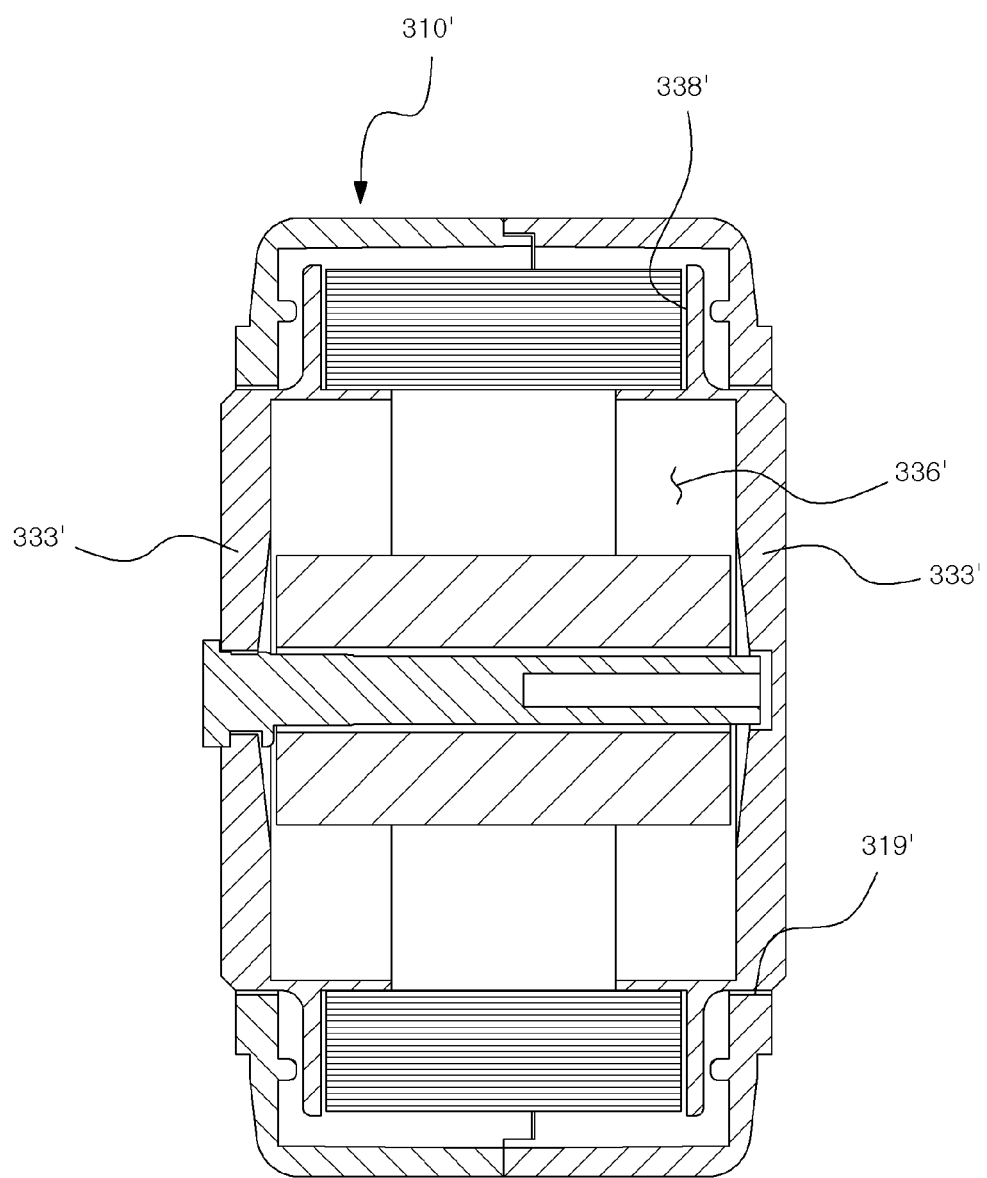
FIG. 8 is a cross-sectional view for describing a compact-sized tape measure according to an exemplary embodiment of the present invention.

FIG. 8 is a cross-sectional view for describing a compact-sized tape measure according to an exemplary embodiment of the present invention.

Referring to FIG. 8, a compact-sized tape measure may include a housing 310', a reel including a bobbin 330' and a spring, and a blade. The bobbin 330' includes an inner space 336' formed to have a relatively larger width than an outer space 338' and may have a central convex portion 333' formed at both sides based on the rotation shaft of the bobbin 330' in response to the inner space 336'.

The central convex portion 333' has a structure protruding relatively around the periphery thereof, may correspond to the first disk outer wall, and may be exposed to the outside through a through hole 319' formed in the housing 310'. In the exemplary embodiment, the through hole 319' is formed at both sides of the housing 310 and the central convex portion 333' may be exposed at both left and right sides of the housing 310'.

Figure 9:
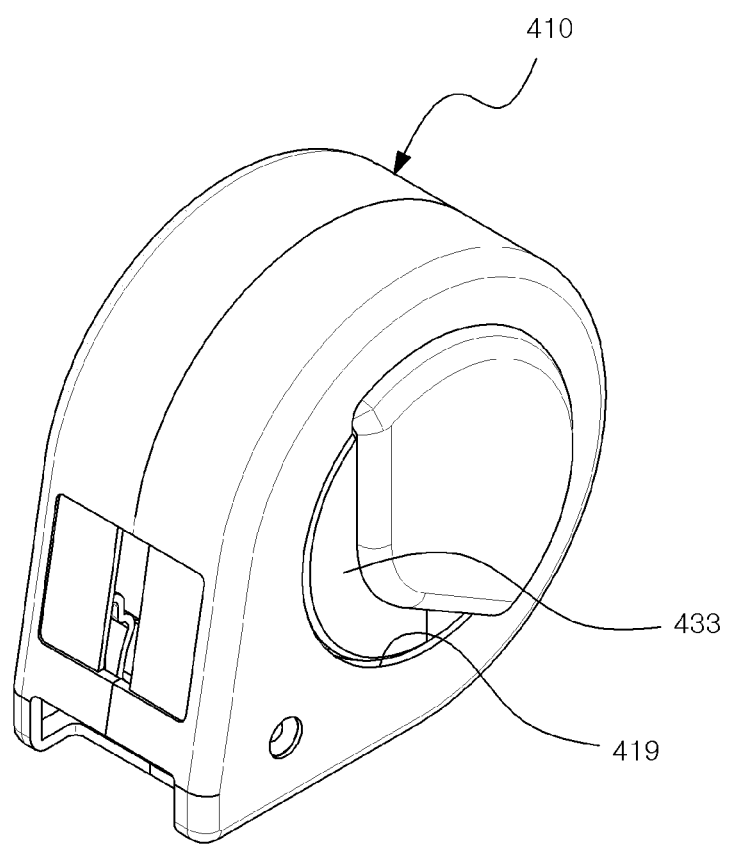
FIG. 9 is a perspective view for describing a compact-sized tape measure according to an exemplary embodiment of the present invention.
Figure 10:
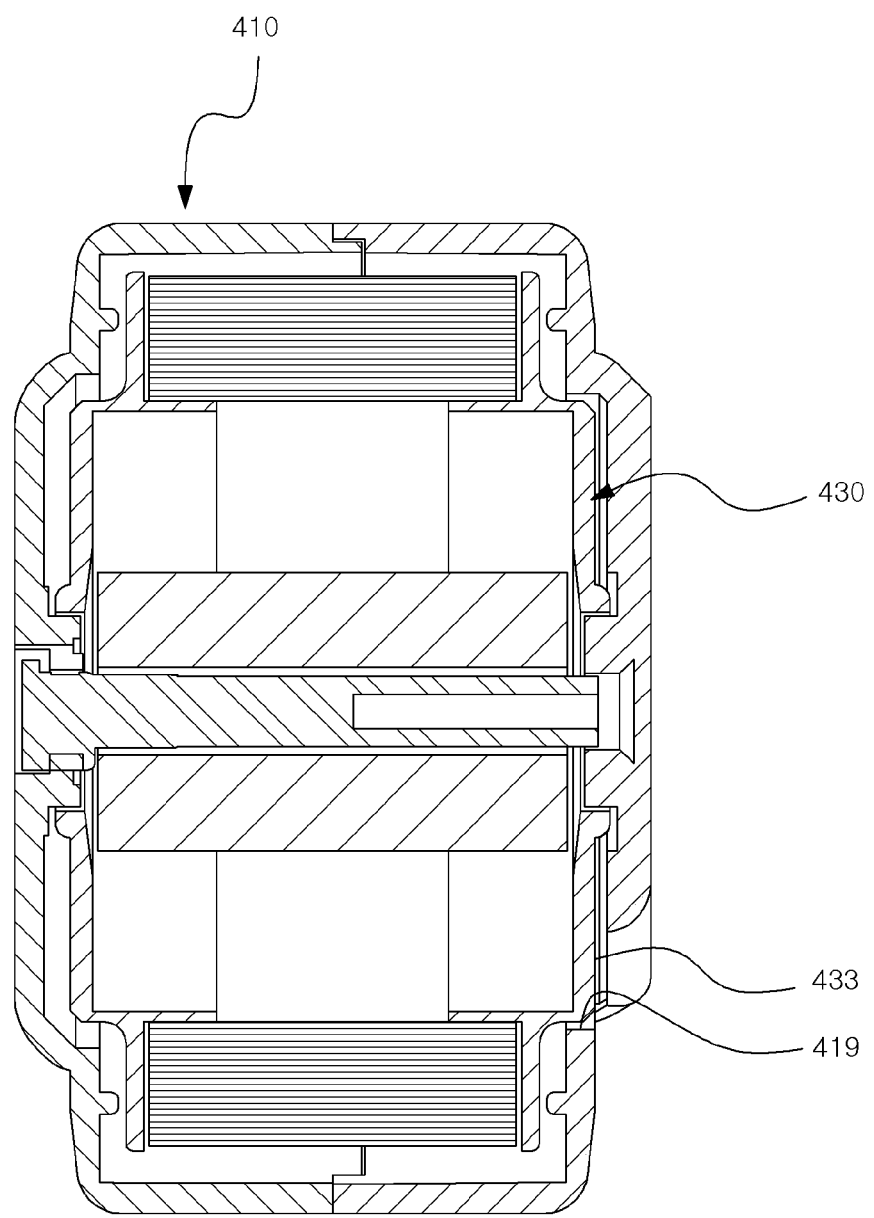
FIG. 10 is a cross-sectional view for describing an internal structure of the compact-sized tape measure of FIG. 9.

FIG. 9 is a perspective view for describing a compact-sized tape measure according to an exemplary embodiment of the present invention and FIG. 10 is a cross-sectional view for describing an internal structure of the compact-sized tape measure of FIG. 9.

Referring to FIGS. 9 and 10, a compact-sized tape measure 400 may include a housing 410, a reel including a bobbin 430 and a spring, and a blade. The bobbin 430 includes a central convex portion 433 formed to correspond to an inner space 436 and a central convex portion 433 may be exposed to the outside through a through hole 419 formed in the housing 410. However, the through hole 419 may expose not the entire central convex portion 433 but only a part of the central convex portion 433, and particularly, the through hole 419 is formed to be biased from the rotation shaft to expose a part of the central convex portion 433 while receiving the rotation shaft of the reel.

Even if the central convex portion 433 of the bobbin 430 is partially exposed, the user may directly lock or unlock the rotation of the reel by pressing a part of the bobbin 430. The through holes 419 partially exposing the central convex portion 433 may be formed at one side or both sides, and the through holes 419 may be symmetrical to each other or may be formed in different shapes and positions.

Figure 11:
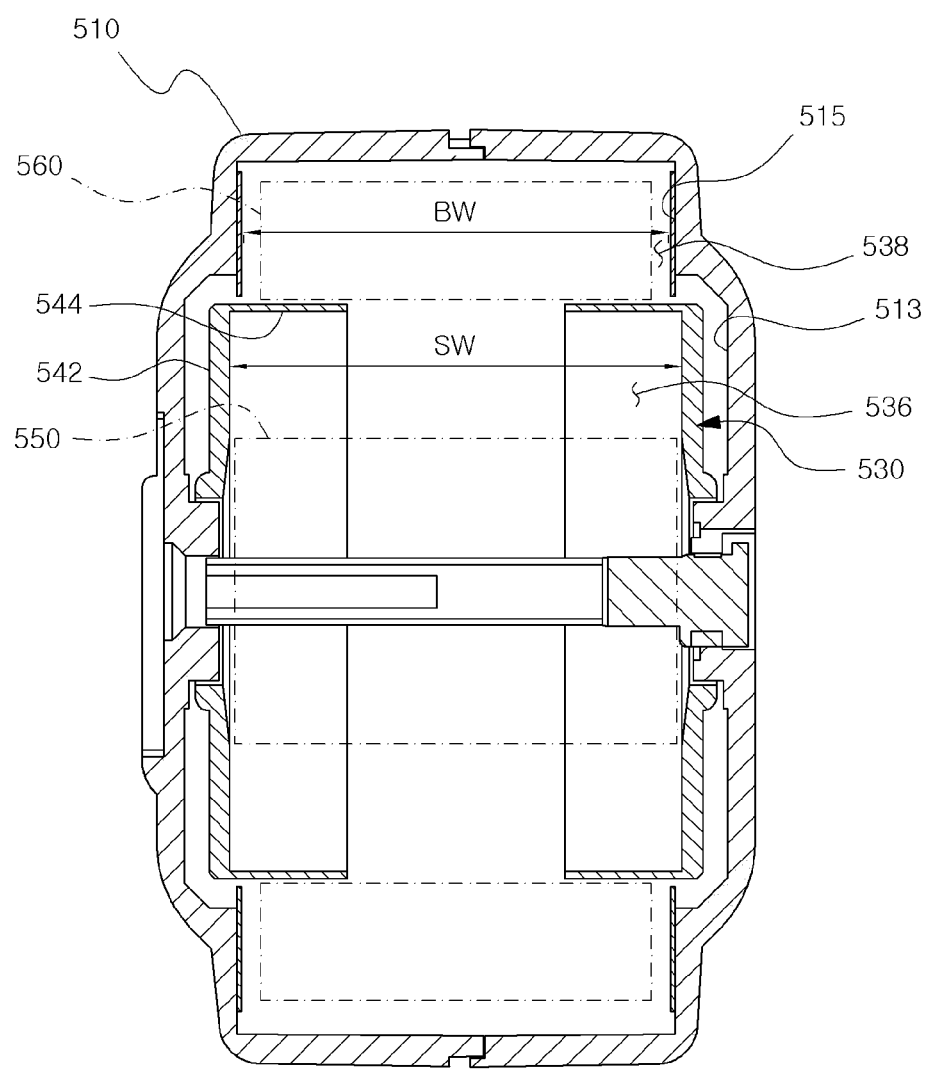
FIGS. 11 to 13 are cross-sectional views for describing an internal structure of a compact-sized tape measure according to an exemplary embodiment of the present invention.
Figure 12:
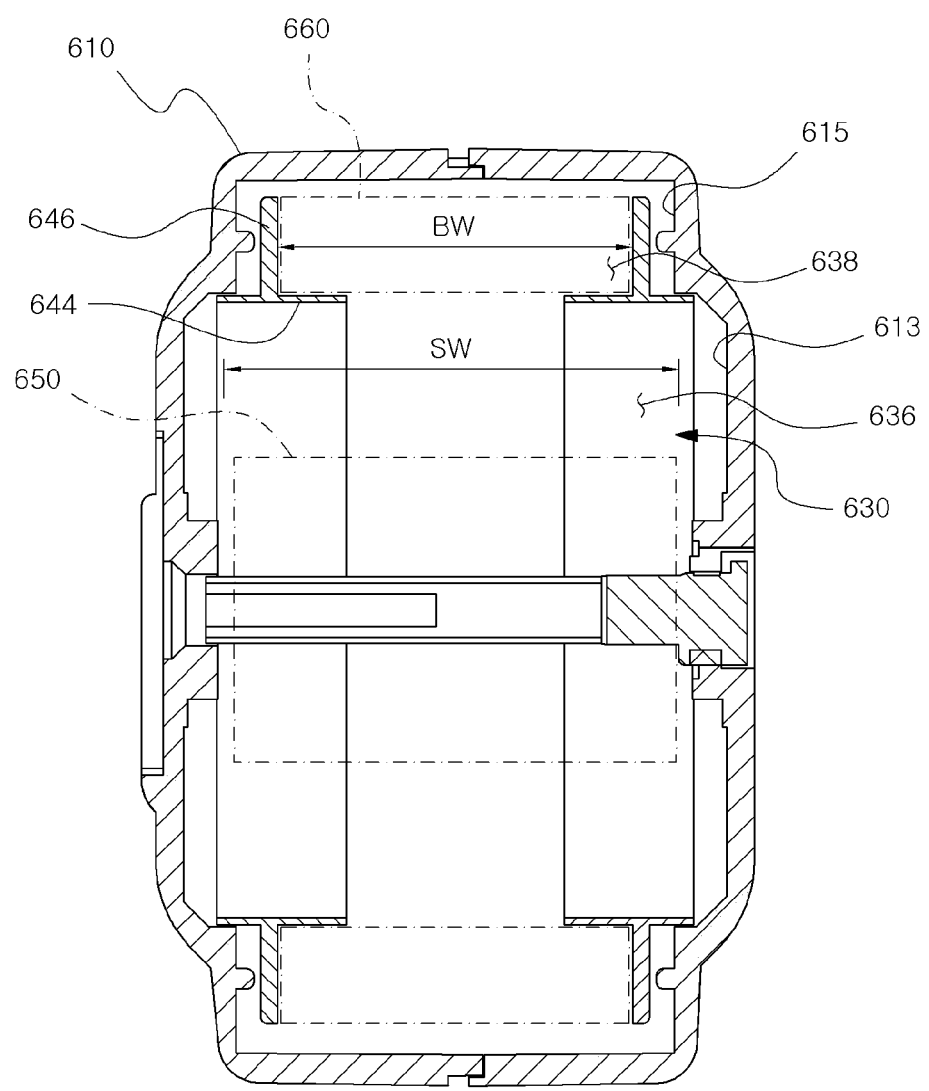
Figure 13:
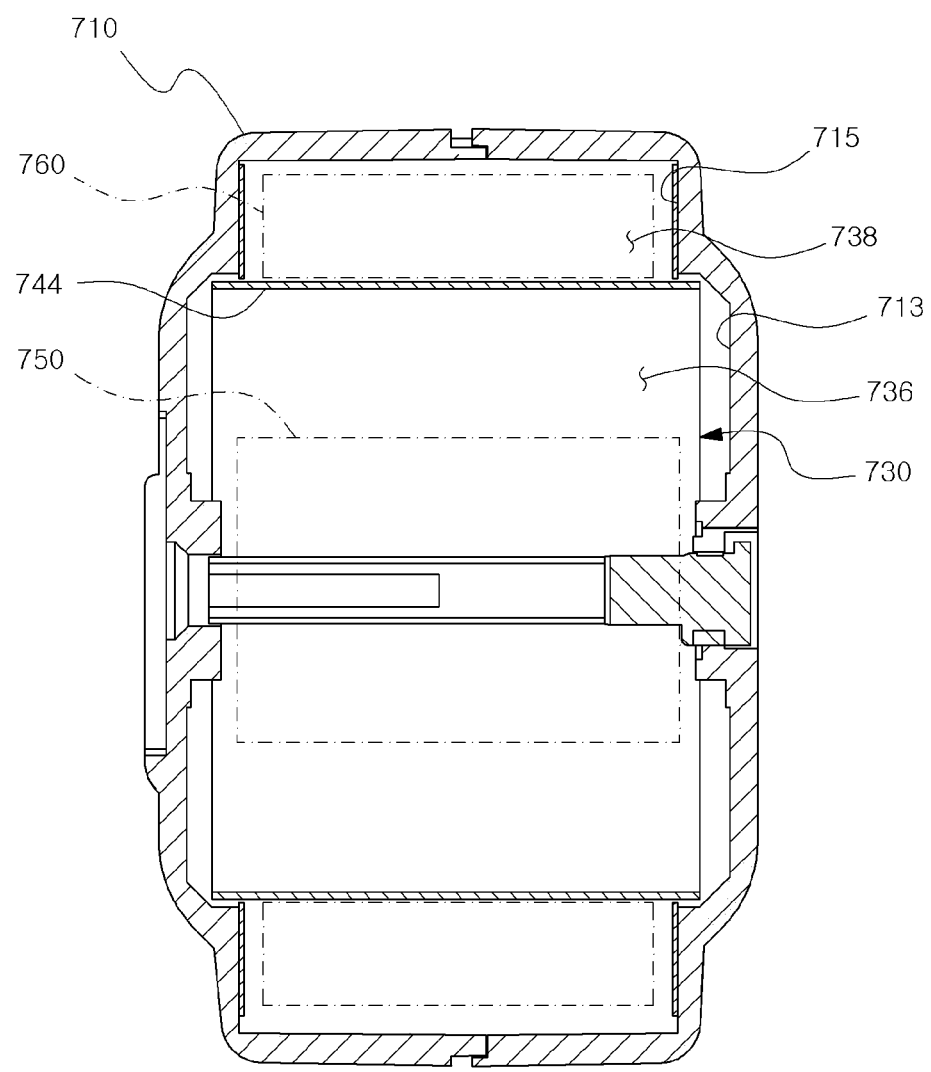

FIGS. 11 to 13 are cross-sectional views for describing an internal structure of a compact-sized tape measure according to an exemplary embodiment of the present invention.

Referring to FIG. 11, a compact-sized tape measure may include a housing 510 and a bobbin 530 received in the housing 510. The bobbin 530 may include a first bobbin portion and a second bobbin portion which are laterally separated from each other, and an inner space 536 and an outer space 538 may be distinguished from each other based on a partition wall 544 formed between the first bobbin portion and the second bobbin portion.

Even in the exemplary embodiment, the outer space 538 and the inner space 536 are provided by the bobbin 530, but the bobbin 530 may define the outer space 538 together with the housing 510.

To this end, the housing 510 may include a protrusion 513 providing an inner surface extended abound a rotation shaft of the reel in response to the inner space 536 and a peripheral portion 515 providing an inner surface relatively narrower than the protrusion 513 in response to the outer space 538. The bobbin 530 may be formed by including a partition wall 544 provided between the inner space 536 and the outer space 538 and a first disk outer wall 542 connected to the partition wall 544 and provided at both sides of the inner space 536. Here, the outer space 538 may be defined by the partition wall 544 of the bobbin 530 and the inner surface of the peripheral portion 515 without a separate structure for defining the outer space 538 in the bobbin 530.

In some cases, a ring-shaped protective film for protecting the blade 560 may also be further included on both sides of the inner surface of the peripheral portion 515.

Referring to FIG. 12, a compact-sized tape measure may include a housing 610 and a bobbin 630 received in the housing 610. The bobbin 630 may include a first bobbin portion and a second bobbin portion which are laterally separated from each other, and an inner space 636 and an outer space 638 may be distinguished from each other based on a partition wall 644 formed between the first bobbin portion and the second bobbin portion.

Even in the exemplary embodiment, the outer space 638 and the inner space 636 are provided by the bobbin 630, but the bobbin 630 may define the inner space 636 together with the housing 610.

To this end, the housing 610 may include a protrusion 613 providing an inner surface extended abound a rotation shaft of the reel in response to the inner space 636 and a peripheral portion 615 providing an inner surface relatively narrower than the protrusion 613 in response to the inner space 636. The bobbin 630 may be formed by including a partition wall 644 provided between the inner space 636 and the outer space 638 and a second disk outer wall 646 connected to the partition wall 644 and provided at both sides of the outer space 638. That is, the first bobbin portion and the second bobbin portion may include a second disk outer wall 646 protruding outward from the cylindrical partition wall 644, and the inner space 636 may be defined by the partition wall 644 of the bobbin 630 and the inner surface of the protrusion 613 without a separate structure for defining the inner space 636 in the bobbin 630.

A separate structure connected to the rotation shaft may be omitted in the bobbin 630, and the partition wall 644 of the bobbin 630 may be elastically supported by the spring 650 and the like to be supported by a step connecting the peripheral portion 615 and the protrusion 613 in the housing 610.

In some cases, a disk-shaped protective film for protecting the spring 650 may also be further included on both sides of the inner surface of the protrusion 613.

Referring to FIG. 13, a compact-sized tape measure may include a housing 710 and a bobbin 730 received in the housing 710, and the bobbin 730 may include only a partition wall 744 made of a metal or a synthetic resin material and may be provided in a cylindrical shape, and the partition wall 744 may distinguish an inner space 736 and an outer space 738 from each other.

Even in the exemplary embodiment, the outer space 738 and the inner space 736 are provided by the bobbin 730, but the bobbin 730 may define the inner space 736 and the outer space 738 together with the housing 710.

To this end, the housing 710 may include a protrusion 713 which provides an inner surface extended around a rotation shaft of a reel in response to the inner space 736, and a peripheral portion 715 providing an inner surface relatively narrower than the protrusion 713 in response to the outer space 738. The inner space 736 may be defined by the partition wall 744 of the bobbin 730 and the inner surface of the protrusion 713 without a separate structure (e.g., a disk outer wall) for defining the inner space 736 and the outer space 738, and the outer space 738 may be defined by the partition wall 744 of the bobbin 730 and the inner surface of the peripheral portion 715.

A separate structure connected to the rotation shaft may be omitted in the bobbin 730, and the partition wall 744 of the bobbin 730 may be elastically supported by the spring 750 and the like to be supported by a step connecting the peripheral portion 715 and the protrusion 713 in the housing 710.

In some cases, a disk-shaped protective film for protecting the spring 750 may be further included at both sides of the inner surface of the protrusion 713, and a ring-shaped protective film for protecting the blade 760 may be further included at both sides of the inner surface of the peripheral portion 715.

As described above, although the present invention has been disclosed with reference to the preferred embodiments, those skilled in the art will appreciate that various modifications, additions and substitutions are possible, without departing from the scope and spirit of the invention as disclosed in the accompanying claims.

The invention claimed is:

1. A compact-sized tape measure comprising a housing, a reel rotatably mounted in the housing, and a blade wound on an outer surface of the reel and drawn out through an inlet of the housing,
   wherein the reel includes a spring providing a force for winding the blade and a bobbin providing an inner space receiving the spring and an outer space for winding and storing the blade,
   a width of a spring receiving space capable of receiving the spring in the inner space is larger than a width of a blade receiving space capable of receiving the blade in the outer space, and
   a width of the spring received in the inner space is larger than a width of the blade wound on the outer space,
   wherein the housing includes a protrusion protruding around a rotation shaft of the reel in response to the inner space and a peripheral portion provided with a width relatively smaller than the protrusion in response to the outer space, and for easy holding of the user, the protrusion protrudes in a rotation shaft direction of the reel above the peripheral portion.

2. The compact-sized tape measure of claim 1, wherein the width of the spring is more than 120% and equal to or less than 140% larger than the width of the blade.

3. The compact-sized tape measure of claim 1, wherein the bobbin includes a first bobbin portion and a second bobbin portion which are laterally separated from in the rotation shaft direction, and the first bobbin portion and the second bobbin portion include a first disk outer wall corresponding to the inner space, a cylindrical partition wall formed vertically on the first disk outer wall, and a second disk outer wall extended from the partition wall and corresponding to the outer space, and
   the partition walls of the first bobbin portion and the second bobbin portion support both ends of the blade in a width direction, a gap between the first disk outer walls corresponds to a width of the spring receiving space, and a gap between the second disk outer walls corresponds to the blade receiving space.

4. The compact-sized tape measure of claim 3, wherein the first bobbin portion and the second bobbin portion are provided to be independently rotatable.

5. The compact-sized tape measure of claim 1, wherein the bobbin includes a central convex portion corresponding to the inner space and a through hole exposing the central convex portion to the outside is provided in the housing to restrict or release the rotation of the reel using the central convex portion exposed through the through hole.

6. The compact-sized tape measure of claim 5, wherein the through hole is formed at one side or both sides of the housing and the central convex portion is exposed to one side or both sides of the housing.

7. The compact-sized tape measure of claim 1, wherein a width of the spring receiving space is defined from the outer surface of the rotation shaft of the reel to the partition wall formed between the inner space and the outer space and larger than the width of the spring.

8. The compact-sized tape measure of claim 1, wherein the bobbin includes a partition wall provided between the inner space and the outer space, and the outer space is defined by the partition and the inner surface of the peripheral portion.

9. The compact-sized tape measure of claim 1, wherein the bobbin includes a partition wall provided between the inner space and the outer space, and the inner space is defined by the partition and the inner surface of the peripheral portion.

10. The compact-sized tape measure of claim 1, wherein the bobbin includes a partition wall provided between the inner space and the outer space, and the outer space is defined by the partition and the inner surface of the peripheral portion and the inner space is defined by the partition and the inner surface of the peripheral portion.

11. A compact-sized tape measure comprising a housing, a reel rotatably mounted in the housing, and a blade wound on an outer surface of the reel and drawn out through an inlet of the housing,
   wherein the reel includes a spring providing a force for winding the blade and a bobbin providing an inner space receiving the spring and an outer space for winding and storing the blade,
   a width of a spring receiving space capable of receiving the spring in the inner space is larger than a width of a blade receiving space capable of receiving the blade in the outer space, and
   the housing includes a protrusion protruding around a rotation shaft of the reel in response to the inner space and a peripheral portion provided with a width relatively smaller than the protrusion in response to the outer space, and for easy holding of the user, the protrusion protrudes in a rotation shaft direction of the reel above the peripheral portion.

12. The compact-sized tape measure of claim 11, wherein a width of the spring is more than 120% and equal to or less than 140% larger than a width of the blade.

13. A compact-sized tape measure comprising a housing, a reel rotatably mounted in the housing, and a blade wound on an outer surface of the reel and drawn out through an inlet of the housing,
    wherein the reel includes a spring providing a force for winding the blade and a bobbin providing an inner space receiving the spring and an outer space for winding and storing the blade,
    a width of a spring receiving space capable of receiving the spring in the inner space is larger than a width of a blade receiving space capable of receiving the blade in the outer space, and
    wherein the bobbin includes a first bobbin portion and a second bobbin portion which are laterally separated from in the rotation shaft direction, and the first bobbin portion and the second bobbin portion include a first disk outer wall corresponding to the inner space, a cylindrical partition wall formed vertically on the first disk outer wall, and a second disk outer wall extended from the partition wall and corresponding to the outer space, and
    the partition walls of the first bobbin portion and the second bobbin portion support both ends of the blade in a width direction, a gap between the first disk outer walls corresponds to a width of the spring receiving space, and a gap between the second disk outer walls corresponds to the blade receiving space.

14. The compact-sized tape measure of claim 13, wherein the first bobbin portion and the second bobbin portion are provided to be independently rotatable.

* * * * *